US012590822B2

(12) United States Patent
Ma et al.

(10) Patent No.:  US 12,590,822 B2
(45) Date of Patent:      Mar. 31, 2026

(54) METHOD OF AMPLITUDE-PHASE INCONSISTENCY IN-SITU CORRECTION FOR THE MULTI-CHANNEL CAPACITIVE SENSOR

(71) Applicant: HUAZHONG UNIVERSITY OF SCIENCE AND TECHNOLOGY, Hubei (CN)

(72) Inventors: Hong Ma, Hubei (CN); Yuerong Zhang, Hubei (CN); Hua Zhang, Hubei (CN)

(73) Assignee: HUAZHONG UNIVERSITY OF SCIENCE AND TECHNOLOGY, Hubei (CN)

( * ) Notice: Subject to any disclaimer, the term of this patent is extended or adjusted under 35 U.S.C. 154(b) by 233 days.

(21) Appl. No.: 18/581,352

(22) Filed: Feb. 19, 2024

(65) Prior Publication Data

US 2025/0146845 A1      May 8, 2025

(30) Foreign Application Priority Data

Nov. 8, 2023   (CN) ......................... 202311500847.1

(51) Int. Cl.
*G01D 18/00* (2006.01)
*G01D 5/24* (2006.01)
(52) U.S. Cl.
CPC .............. *G01D 18/00* (2013.01); *G01D 5/24* (2013.01)
(58) Field of Classification Search
CPC .......... G01R 1/045; G01R 1/30; G01R 27/02; G01R 27/26; G01R 27/2605
See application file for complete search history.

(56) References Cited

U.S. PATENT DOCUMENTS

| | | | | |
|---|---|---|---|---|
| 6,747,744 B2 * | 6/2004 | Hill | .................... | G01B 9/02003 |
| | | | | 356/486 |
| 9,360,445 B2 * | 6/2016 | Carlsen, Jr. | .......... | G01N 27/121 |
| 9,995,701 B2 * | 6/2018 | Mohseni | .............. | G01N 27/026 |
| 10,073,074 B1 * | 9/2018 | Kumar | ................. | G01N 27/026 |
| 2013/0293249 A1 * | 11/2013 | Han | .................. | G01R 31/2822 |
| | | | | 324/750.02 |
| 2014/0368830 A1 * | 12/2014 | Michelt | .............. | G01B 11/0608 |
| | | | | 356/485 |

* cited by examiner

*Primary Examiner* — Huy Q Phan
*Assistant Examiner* — Temilade S Rhodes-Vivour
(74) *Attorney, Agent, or Firm* — JCIPRNET

(57) ABSTRACT

The disclosure provides a method and device for correction of the multi-channel capacitive sensor. The method includes: under calibrating mode, inputting the calibration signal from the calibration capacitance network module to the multi-channel capacitive sensor, and measuring the output complex voltage at each calibration frequency point; selecting any channel as a reference channel, combining each-channel three-admittance parameters with the output complex voltages at each calibration frequency point, calculating each-channel amplitude-phase correction coefficient relative to the reference channel; under operating mode, inputting a carrier signal to the multi-channel capacitive sensor through the multiple DoF sensitive probe, and measuring the output complex voltages under actual operation; and multiplying the output complex voltages by the correction coefficients, thereby obtaining the multiple sensing channel output signals.

5 Claims, 4 Drawing Sheets

METHOD OF AMPLITUDE-PHASE INCONSISTENCY IN-SITU CORRECTION FOR THE MULTI-CHANNEL CAPACITIVE SENSOR

CROSS-REFERENCE TO RELATED APPLICATION

This application claims the priority benefit of China application serial no. 202311500847.1, filed on Nov. 8, 2023. The entirety of the above-mentioned patent application is hereby incorporated by reference herein and made a part of this specification.

BACKGROUND

Technical Field

The disclosure belongs to the field of sensor parameter correction, and in particular, relates to a method and device of amplitude-phase inconsistency in-situ correction of multi-channel capacitive sensor.

Description of Related Art

Capacitive sensing technology possesses high accuracy, large dynamic range, non-contact measurement features and is widely applied for precision measuring some physical quantities such as displacement, acceleration, angle, vibration and etc. High accurate capacitive sensing circuit (CSC) is a critical part of inertial sensor for space gravitational wave detection. A set of multi-channel CSCs can be used to detect capacitance variation within a mechanical sensitive probe of inertial sensor caused by motion of test mass (TM), and then convert the capacitance variation to TM displacement values along different directions. The different amplitude-phase transferring characteristics among the multiple capacitive sensing channels will eventually lead to bad accuracy of displacement measurement, especially for tiny displacement of TM. Therefore, the amplitude-phase inconsistency among multiple capacitance sensing channels must be compensated to ensure displacement measurement accuracy.

The CSC mainly consists of a transformer bridge, a preamplifier, a main amplifier, and a cascade filter circuit. The parameter differences in the transformer's primary/secondary winding coil self-inductance, mutual inductance, ohmic resistance, etc., in each sensing channel, the inconsistency in gains of the preamplifier and main amplifier, and the parameter differences in other circuit components of the sensing channels will eventually lead to inter-channel inconsistent transmission characteristics. The detection accuracy of the multiple DoF displacement signals is thereby affected. Both the currently-available capacitive sensing methods and devices do not consider the influence of amplitude-phase inconsistency among multi-channel CSCs on the measurement accuracy. The space gravitational wave detection requires the CSCs capable of detecting nanometer- to micron-level TM displacements within the inertial sensor under multiple displacement degrees of freedom in millihertz band. As such, the amplitude-phase inconsistency among multiple displacement sensing channels will cause output signal errors and affect multi-channel displacement signal detection. Ultimately, the multi-channel CSCs cannot satisfy the space gravitational wave detection mission requirements.

SUMMARY

Given the defects of existing technology, the disclosure provides a method and device of amplitude-phase inconsistency in-situ correction for the multi-channel capacitive sensor to solve the problem that the currently available capacitive sensing methods and devices neglect the inter-channel amplitude-phase inconsistency, which results in low measurement accuracy of multi-channel CSCs.

To achieve the above, on the one hand, the disclosure provides an in-situ correction method of amplitude-phase inconsistency for multi-channel capacitive sensor, which includes the following steps.

In S1, under calibrating mode, the calibration signal is input from the calibration capacitance network module to the multi-channel capacitive sensor, and the output complex voltages of the sensor are measured at each calibration frequency point.

In S2, the calibration capacitance network module is equivalent to multi-channel three-admittance networks, the port scattering parameters of each equivalent three-admittance network are measured, and each-channel three-admittance parameters at each calibration frequency point are extracted.

In S3, any channel of the capacitive sensor can be selected as a reference channel, and each-channel amplitude-phase correction coefficient relative to the reference channel can be calculated according to each-channel three-admittance parameters and the output complex voltages of multi-channel capacitive sensor at each calibration frequency point.

In S4, under operating mode, the carrier signal is input to multi-channel capacitive sensor through a multiple DoF sensitive probe, and the output complex voltages of the sensor under actual operation are measured.

In S5, the output complex voltages of multi-channel capacitive sensor under actual operation are multiplied by the amplitude-phase correction coefficients, and the output signals of the multiple sensing channels are obtained after eliminating inter-channel amplitude-phase inconsistency.

The calibration capacitance network module includes a one-to-multiple equal-amplitude in-phase power splitter and a multi-channel calibration capacitance network, each channel of which includes three capacitors with the same nominal value and connected in a Y-shaped manner, and two single-pole double-throw switches connected to the capacitors.

Further preferably, the method of extracting each-channel three-admittance parameters at each calibration frequency point is as follows.

The scattering parameter matrix of the $i^{th}$-channel three-admittance network at each frequency point is measured, and the amplitudes and phases of the scattering parameters at each frequency point are calculated.

The amplitude- and phase-frequency curves of the scattering parameters at each frequency point are smoothed, and the smoothed scattering parameter matrix of the $i^{th}$-channel three-admittance network is obtained.

The admittance matrix at each frequency point of the $i^{th}$-channel three-admittance network is calculated according to the smoothed scattering parameter matrix and termination impedances of the $i^{th}$-channel three-admittance network.

The variable optimization equations of the $i^{th}$-channel three-admittance network are established based on the admittance matrix at each frequency point, and its three-admittance parameters at each calibration frequency point are solved.

Further preferably, the first channel of the capacitive sensor is selected as a reference channel, and the amplitude-phase inconsistency correction coefficient of the $i^{th}$ sensing channel at each calibration frequency point relative to the reference channel is:

$$\dot{\beta}_{1i}(f) = \frac{\dot{V}_{O1}(f)}{\dot{V}_{Oi}(f)} \cdot \frac{\dot{h}_i(Y_{i1}(f), Y_{i2}(f), Y_{i3}(f))}{\dot{h}_1(Y_{11}(f), Y_{12}(f), Y_{13}(f))},$$

where $\dot{\beta}_{1i}(f)$ is the amplitude-phase inconsistency correction coefficient of the $i^{th}$ sensing channel relative to the reference channel, $\dot{V}_{O1}(f)$ is the output complex voltage of the reference channel in the capacitive sensor, $\dot{V}_{Oi}(f)$ is the output complex voltage of the multi-channel capacitive sensor, $\dot{h}_i(Y_{i1}(f), Y_{i2}(f), Y_{i3}(f))$ is the complex transfer function of the $i^{th}$-channel equivalent calibration admittance network, $\dot{h}_1(Y_{11}(f), Y_{12}(f), Y_{13}(f))$ is the complex transfer function of the reference channel in the equivalent calibration admittance network, and $Y_{i1}(f)$, $Y_{i2}(f)$, $Y_{i3}(f)$ are the three-admittance parameters of the $i^{th}$-channel equivalent calibration admittance network at each calibration frequency point.

Further preferably, the output complex voltage of multi-channel capacitive sensor at each calibration frequency point is: $\dot{V}_{Oi}(f) = I_i(f) + j \cdot Q_i(f)$, $$\begin{cases} I_i(f) = \dfrac{2}{N} \cdot \sum_{n=1}^{N} \left\{ i_i(n)\cos\left(\dfrac{2\pi \cdot \Delta f \cdot n}{f_{DDC}}\right) \right\} \\ Q_i(f) = -\dfrac{2}{N} \cdot \sum_{n=1}^{N} \left\{ i_i(n)\sin\left(\dfrac{2\pi \cdot \Delta f \cdot n}{f_{DDC}}\right) \right\} \end{cases},$$

where $i_i(n)$ is the output in-phase data sequence after digital orthogonal down-conversion which is sampled by N points with the sampling rate of $f_{DDC}$, $n=1, 2, \ldots, N$, and $\Delta f$ is the frequency difference between the local oscillator frequency $f_{LO}$ of the digital orthogonal down-conversion and the calibration input signal frequency f.

On the other hand, the disclosure provides a device of amplitude-phase inconsistency in-situ correction for multi-channel capacitive sensor, which includes the following.

A calibration capacitance network module is included and composed of a one-to-multiple equal-amplitude in-phase power splitter and a multi-channel calibration capacitance network, each channel of which is comprised of three capacitors with the same nominal value and connected in a Y-shaped manner and two single-pole double-throw switches connected to the capacitors. Under calibrating mode, the output terminal of the calibration capacitance network is connected to the multi-channel capacitive sensor and configured to receive the calibration input signal.

A multiple DoF sensitive probe is included, and each pair of its sensing electrodes is connected to the capacitive sensing channel through two single-pole double-throw switches at a Y-shaped branch position in the calibration channel for receiving the capacitive displacement signals under operating mode.

An output signal measuring module is included and configured to measure the output complex voltages of the multi-channel capacitive sensor under calibrating and operating mode.

A vector network analyzer is included and configured to measure the port scattering parameters of multiple equivalent three-admittance networks in the calibration capacitance network module.

An amplitude-phase correction parameter calculating module is included and configured to extract each-channel three-admittance parameters based on the port scattering parameters of the equivalent three-admittance network. Any channel of the capacitive sensor can be selected as a reference channel, and each channel amplitude-phase correction coefficient relative to the reference channel can be calculated according to each-channel three-admittance parameters and the output complex voltages of the multi-channel capacitive sensor at each calibration frequency point.

A multiple sensing channel output signal acquisition module is included and configured to multiply the output complex voltages of the multi-channel capacitive sensor under actual operation by the amplitude-phase correction coefficients, thereby obtaining the multiple sensing channel output signals after eliminating inter-channel amplitude-phase inconsistency.

Further preferably, the amplitude-phase correction parameters calculating module includes the following.

A scattering parameter matrix acquisition unit is included and configured to smooth the amplitude- and phase-frequency curves of the scattering parameters at each frequency point, thereby the smoothed scattering parameter matrix of the $i^{th}$-channel three-admittance network is obtained.

An admittance matrix calculating unit is included and configured to calculate the admittance matrix at each frequency point of the $i^{th}$-channel three-admittance network according to its smoothed scattering parameter matrix and its termination impedances.

A three-admittance parameter calculating unit is included and configured to establish the variable optimization equations in the $i^{th}$-channel three-admittance network based on its admittance matrix and solve its three-admittance parameters at each calibration frequency point.

A correction coefficient calculating unit is included and configured to select any channel in the capacitive sensor as a reference channel, and each-channel amplitude-phase correction coefficient relative to the reference channel can be calculated according to each-channel three-admittance parameters and the output complex voltages of the multi-channel capacitive sensor at each calibration frequency point.

Further preferably, the first channel of the capacitive sensor is selected as a reference channel, and the amplitude-phase inconsistency correction coefficient of the $i^{th}$ sensing channel at each calibration frequency point relative to the reference channel is:

$$\dot{\beta}_{1i}(f) = \frac{\dot{V}_{O1}(f)}{\dot{V}_{Oi}(f)} \cdot \frac{\dot{h}_i(Y_{i1}(f), Y_{i2}(f), Y_{i3}(f))}{\dot{h}_1(Y_{11}(f), Y_{12}(f), Y_{13}(f))},$$

where $\dot{\beta}_{1i}(f)$ is the amplitude-phase inconsistency correction coefficient of the $i^{th}$ sensing channel relative to the reference channel, $\dot{V}_{O1}(f)$ is the output complex voltage of the reference channel in the capacitive sensor, $\dot{V}_{Oi}(f)$ is the output complex voltage of the multi-channel capacitive sensor, $\dot{h}_i(Y_{i1}(f), Y_{i2}(f), Y_{i3}(f))$ is the complex transfer function of the $i^{th}$-channel equivalent calibration admittance network, $\dot{h}_1(Y_{11}(f), Y_{12}(f), Y_{13}(f))$ is the complex transfer function of the reference channel in the equivalent calibration admittance network, and $Y_{i1}(f)$, $Y_{i2}(f)$, $Y_{i3}(f)$ are the three-admittance parameters of the $i^{th}$-channel equivalent calibration admittance network at each calibration frequency point.

Further preferably, the output complex voltage of multi-channel capacitive sensor at each calibration frequency point is: $\dot{V}_{Oi}(f) = I_i(f) + j \cdot Q_i(f)$, $$\begin{cases} I_i(f) = \dfrac{2}{N} \cdot \sum_{n=1}^{N} \left\{ i_i(n)\cos\left(\dfrac{2\pi \cdot \Delta f \cdot n}{f_{DDC}}\right) \right\} \\ Q_i(f) = -\dfrac{2}{N} \cdot \sum_{n=1}^{N} \left\{ i_i(n)\sin\left(\dfrac{2\pi \cdot \Delta f \cdot n}{f_{DDC}}\right) \right\} \end{cases},$$

where $i_i(n)$ is the output in-phase data sequence after digital orthogonal down-conversion which is sampled by N points with sampling rate of $f_{DDC}$, n=1, 2, . . . , N, and $\Delta f$ is a frequency difference between the local oscillator frequency $f_{LO}$ of the digital orthogonal down-conversion and the calibration input signal frequency f.

The multiple DoF capacitive sensor designed based on the method and device of amplitude-phase inconsistency in-situ correction for multi-channel capacitive sensor provided by the disclosure can be applied to inertial sensors for space gravitational wave detection.

DESCRIPTION OF THE EMBODIMENTS

Figure 1:
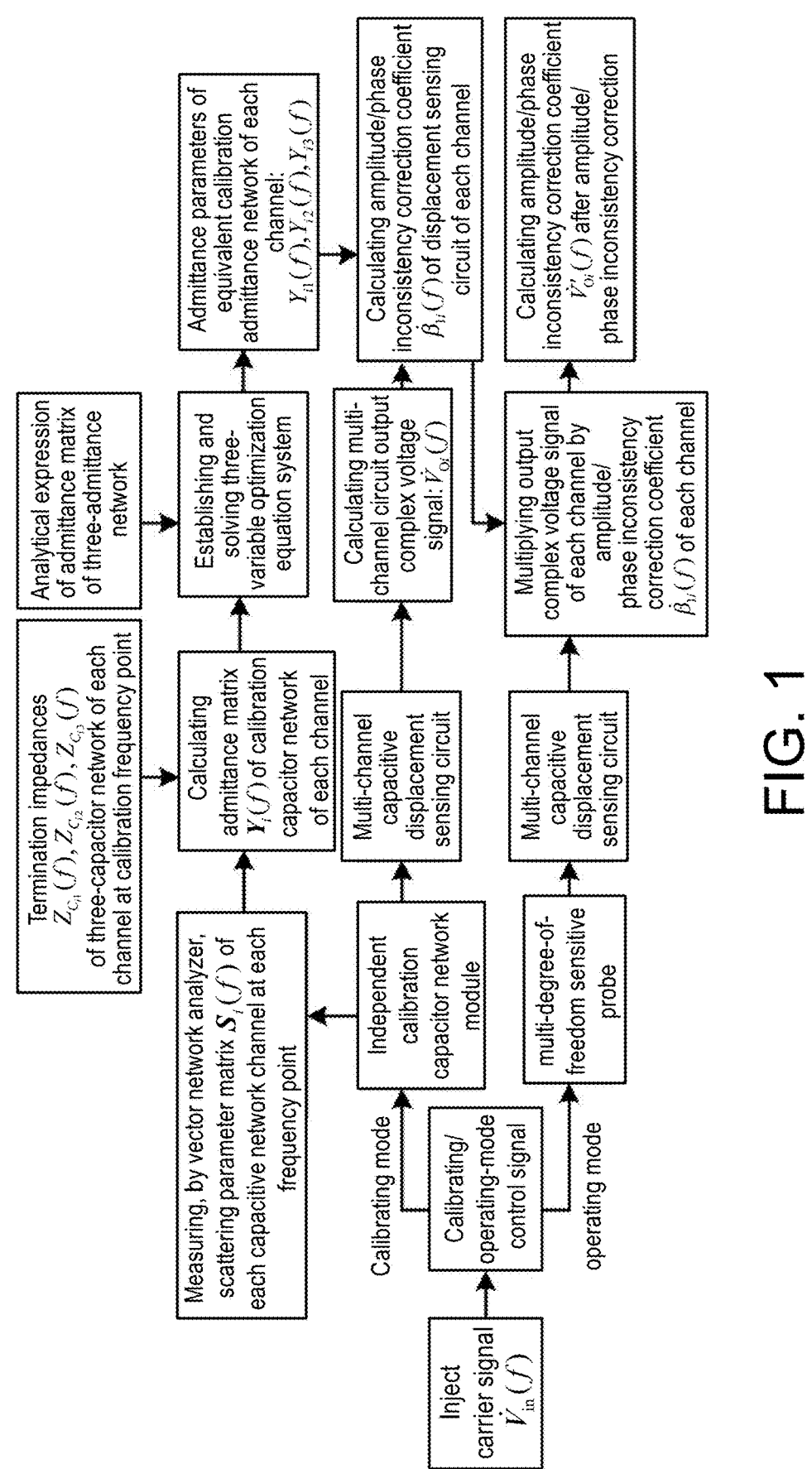
FIG. 1 is the flow chart of amplitude-phase inconsistency in-situ correction method for the multi-channel capacitive sensor based on the calibration capacitance network module according to an embodiment of the disclosure.

For more clarity and understandability of the disclosure's objectives, technical solutions, and advantages, the following provides a further detailed description combing the drawings and embodiments. The specific embodiments described herein explain the disclosure merely and are not used to limit the disclosure.

The disclosure provides an amplitude-phase inconsistency in-situ correction method for multi-channel capacitive sensor, including the following steps.

In step 1, an independent calibration capacitance network module is designed, and the calibrating mode and operating mode are switched based on the arrangement of switches in the module. Under calibrating mode, a calibration signal $\dot{V}_{in}(f)$ is input to the multi-channel capacitive sensor from the calibration capacitance network module, and then the output complex voltage $\dot{V}_{Oi}(f)$ (i=1, 2, . . . ) of the multi-channel capacitive displacement sensor at each calibration frequency point is measured, where i is the channel number.

In step 2, under calibrating mode, the calibration capacitance network module is equivalent to multiple three-admittance networks, port scattering parameters of which are measured and applied to extract the three-admittance parameters of each-channel equivalent calibration admittance network at each calibration frequency point. The first channel is selected as a reference channel, and the others are channels to be compensated. According to the output signals $\dot{V}_{Oi}(f)$ measured under calibrating mode and the three admittance parameters of each-channel equivalent calibration admittance network, the each-channel amplitude-phase correction coefficient $\dot{\beta}_{1i}(f)$ (i=1, 2, . . . ) relative to the reference channel is calculated.

In step 3, under operating mode, each-channel output complex voltage $\dot{V}_{WOi}(f)$ of is multiplied by each-channel calculated amplitude-phase correction coefficient $\dot{\beta}_{1i}(f)$, and the multiple sensing channel output signals $\dot{V}_{Oi}(f)$ (i=1, 2, . . . ) are obtained after eliminating inter-channel amplitude-phase inconsistency.

To be more specific, in step 1, the designed independent calibration capacitance network module is composed of a one-to-multiple equal-amplitude in-phase power splitter and a multi-channel calibration capacitance network, each channel of which is comprised of three capacitors with the same nominal value and connected in a Y-shaped manner, and two single-pole double-throw switches connected to the capacitors. Under calibrating mode, the multi-channel displacement sensor is connected to the calibration capacitance network module by the single-pole double-throw switches, thereby measuring the output complex voltage $\dot{V}_{Oi}(f)$ of the multi-channel CSCs under the calibration input signal excitation at each frequency point. Under operating mode, the multi-channel displacement sensor is connected to the sensing electrode ports of the mechanically sensitive probe by switching the single-pole double-throw switches. The circuit output signals caused by the displacement variation of the TM within the sensitive probe are measured, and then the multi-channel amplitude-phase inconsistency compensation is performed.

To be more specific, in step 1, when measuring the output complex voltages after the output signals of the multi-channel CSCs have been sampled and quantized by the ADC and processed by the digital orthogonal down-conversion, the frequency difference between the local oscillator frequency $f_{LO}$ of the digital orthogonal down-conversion and the calibration input signal frequency f is set to be $\Delta f = f - f_{LO}$. The output in-phase data sequence after digital orthogonal down-conversion is sampled by N points with sampling rate of $f_{DDC}$. The output complex voltage $\dot{V}_{Oi}(f) = I_i(f) + j \cdot Q_i(f)$ after digital orthogonal down-conversion in each displacement sensing channel under the calibration input signal excitation is calculated, where $$\begin{cases} I_i(f) = \dfrac{2}{N} \cdot \sum_{n=1}^{N} \left\{ i_i(n)\cos\left(\dfrac{2\pi \cdot \Delta f \cdot n}{f_{DDC}}\right) \right\} \\ Q_i(f) = -\dfrac{2}{N} \cdot \sum_{n=1}^{N} \left\{ i_i(n)\sin\left(\dfrac{2\pi \cdot \Delta f \cdot n}{f_{DDC}}\right) \right\} \end{cases}.$$

Figure 4:
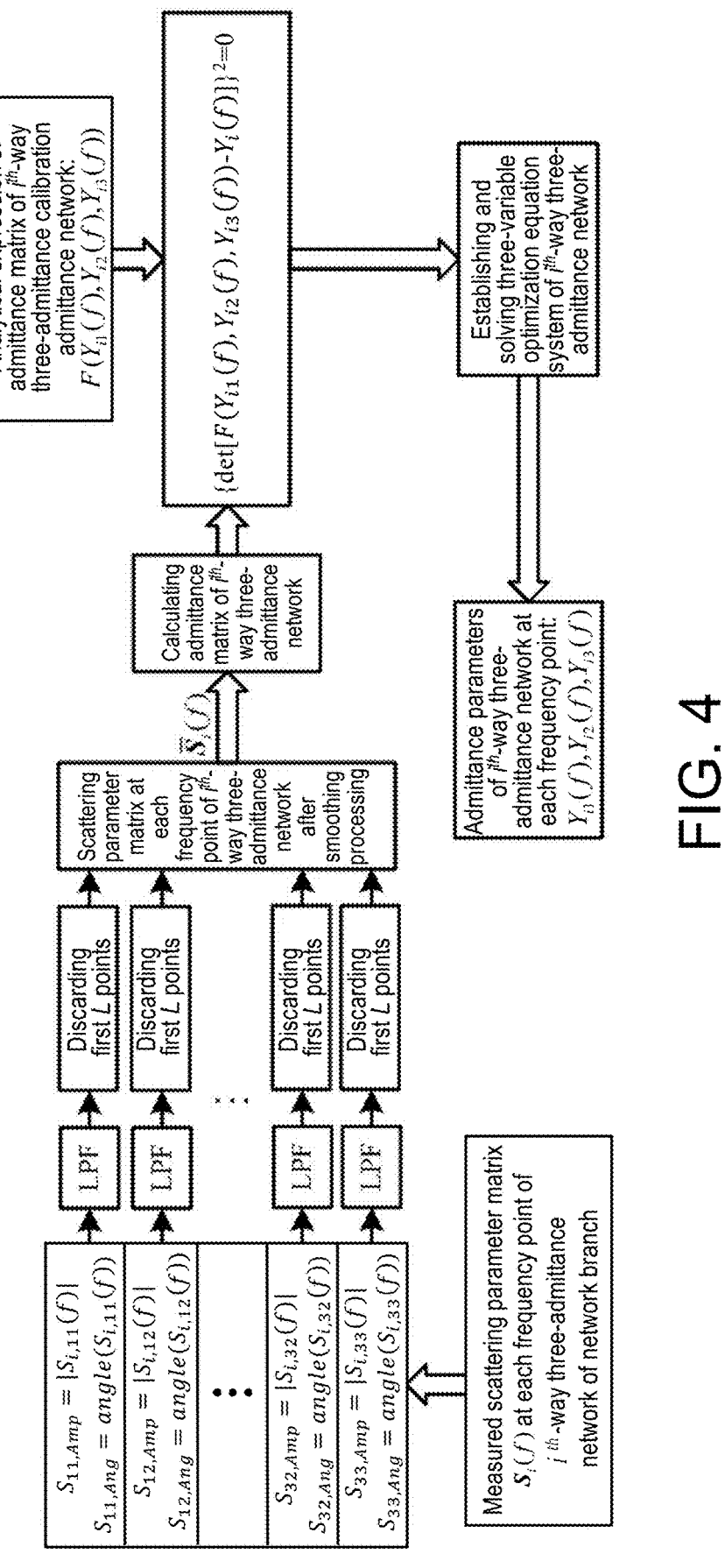
FIG. 4 is the flow chart of parameter extraction of the $i^{th}$-channel equivalent calibration admittance network.

To be more specific, in step 2, the independent calibration capacitance network module can be equivalent to three-admittance networks. A multi-port vector network analyzer is applied to measure the port scattering parameters of the equivalent calibration admittance network formed by each-channel three admittances; that is, each-channel three admittances at each calibration frequency point can be extracted. As shown in FIG. 4, the specific parameter extraction steps are as follows:

In step 2-1, the multi-port vector network analyzer is used to measure the scattering parameter matrix $S_i(f)$ of the $i^{th}$-channel three-admittance network at each frequency point, thereby calculating the amplitudes and phases of the scattering parameters at each frequency point.

In step 2-2, a low-pass filter is used to smooth the amplitude- and phase-frequency curves of the scattering parameters at each frequency point, and the smoothed scattering parameter matrix $\overline{S}_i(f)$ of the $i^{th}$-channel three-admittance network is obtained. If the order of the filter is L, the first L data of the output sequence need to be discarded due to the filter group delay characteristics.

In step 2-3, according to the smoothed scattering parameter matrix $\overline{S}_i(f)$ and termination impedances $Z_{C_{i1}}(f)$, $Z_{C_{i2}}(f)$, and $Z_{C_{i3}}(f)$ of the $i^{th}$-channel three-admittance network, the admittance matrix $Y_i(f)$ at each frequency point of the $i^{th}$-channel three-admittance network is calculated:

$$Y_i(f) = Z_i^{-1}(f) \cdot y_i(f) \cdot Z_i^{-1}(f),$$

$$\text{where } Z_i(f) = \begin{bmatrix} \sqrt{Z_{C_{i1}}(f)} & 0 & 0 \\ 0 & \sqrt{Z_{C_{i2}}(f)} & 0 \\ 0 & 0 & \sqrt{Z_{C_{i3}}(f)} \end{bmatrix},$$

the normalized admittance matrix is $y_i(f)=(I+\overline{S}_i(f))^{-1}(I-\overline{S}_i(f))$, and I is the identity matrix.

In step 2-4, the three-port admittance matrix analytical expression $F(Y_{i1}(f), Y_{i2}(f), Y_{i3}(f))$ of the $i^{th}$-channel equivalent calibration admittance network is:

$$F(Y_{i1}(f), Y_{i2}(f), Y_{i3}(f)) =$$

$$\frac{1}{Y_{i1}(f) + Y_{i2}(f) + Y_{i3}(f)} \begin{bmatrix} Y_{i1}(f)(Y_{i2}(f) + Y_{i3}(f)) & -Y_{i1}(f)Y_{i2}(f) & -Y_{i1}(f)Y_{i3}(f) \\ -Y_{i1}(f)Y_{i2}(f) & Y_{i2}f(Y_{i1}(f) + Y_{i3}(f)) & -Y_{i2}(f)Y_{i3}(f) \\ -Y_{i1}(f)Y_{i3}(f) & -Y_{i2}(f)Y_{i3}(f) & Y_{i3}(f)(Y_{i1}(f) + Y_{i2}(f)) \end{bmatrix}.$$

The three-variable optimization equations for the variables $Y_{i1}(f)$, $Y_{i2}(f)$, and $Y_{i3}(f)$ in the $i^{th}$-channel three-admittance network at each frequency point are established based on $\{\det[F(Y_{i1}(f), Y_{i2}(f), Y_{i3}(f))-Y_i(f)]\}^2=0$. Then, the parameters $Y_{i1}(f)$, $Y_{i2}(f)$, and $Y_{i3}(f)$ are obtained by numerical solution at each calibration frequency point.

In step 2-5, based on the extracted admittance parameters $Y_{i1}(f)$, $Y_{i2}(f)$, and $Y_{i3}(f)$ of the $i^{th}$-channel equivalent calibration admittance network, the complex transfer function $h_i(Y_{i1}(f), Y_{i2}(f), Y_{i3}(f))$ is calculated:

$$h_i(Y_{i1}(f), Y_{i2}(f), Y_{i3}(f)) =$$

$$\frac{Y_{i1}(f) \cdot \Delta Y_i(f)}{[(Y_{i1}(f) + Y_{i2}(f) + Y_{i3}(f)) + R_P Y_{i1}(f)(Y_{i2}(f) + Y_{i3}(f))] \cdot (Y_{i2}(f) + Y_{i3}(f)) - (1 + R_P Y_{i1}(f)) \cdot \Delta Y_i^2(f)},$$

where $\Delta Y_i(f)=Y_{i2}(f)-Y_{i3}(f)$ and $R_P=50\Omega$ is the internal resistance of the calibration input carrier source;

In step 2-6, the amplitude-phase inconsistency correction coefficient $\hat{\beta}_{1i}(f)$ of the $i^{th}$ sensing channel at each calibration frequency point relative to the reference channel is calculated:

$$\hat{\beta}_{1i}(f) = \frac{\dot{V}_{O1}(f)}{\dot{V}_{Oi}(f)} \cdot \frac{h_i(Y_{i1}(f), Y_{i2}(f), Y_{i3}(f))}{h_1(Y_{11}(f), Y_{12}(f), Y_{13}(f))},$$

To be more specific, in step 3, when the multi-channel capacitive sensor is under operating mode, each-channel amplitude-phase correction coefficient $\hat{\beta}_{1i}(f)$ at the calibration frequency point extracted in step 2 is utilized to compensate the amplitude-phase inconsistency of the output complex voltages after digital orthogonal down-conversion. The multi-channel output complex voltages $\dot{V}_{Oi}(f)$ after eliminating inter-channel amplitude-phase inconsistency are obtained as:

$$\dot{V}'_{Oi}(f) = \dot{V}_{WOi}(f) \cdot \hat{\beta}_{1i}(f),$$

Where channel number i=1, 2, . . . .

On the other hand, the disclosure provides a device of amplitude-phase inconsistency in-situ correction for multi-channel capacitive sensor, and the device includes the following.

A calibration capacitance network module composed of a one-to-multiple equal-amplitude in-phase power splitter and a multi-channel calibration capacitance network is included, each channel of which includes three capacitors with the same nominal value and connected in a Y-shaped manner, and two single-pole double-throw switches connected to the capacitors. Under calibrating mode, the output terminal of the calibration capacitance network is connected to the multi-channel capacitive sensor and configured to receive the calibration input signal.

A multiple DoF sensitive probe is included. Under operating mode, each pair of its sensing electrodes is connected to the capacitive sensing channel through two single-pole double-throw switches at a Y-shaped branch position in the calibration channel for receiving the capacitive displacement signals from the sensitive probe.

An output signal measuring module is included and configured to measure the output complex voltages of the multi-channel capacitive sensor under calibrating and operating mode.

A vector network analyzer configured to measure the port scattering parameters of multiple equivalent three-admittance networks in the calibration capacitance network module is included.

An amplitude-phase correction parameter calculating module is included and configured to extract each-channel three-admittance parameters based on the port scattering parameters of the equivalent three-admittance network. Any channel of the capacitive sensor can be selected as a reference channel, and each-channel amplitude-phase correction coefficient relative to the reference channel can be calculated according to each-channel three-admittance parameters and the output complex voltages of the multi-channel capacitive sensor at each calibration frequency point.

A multiple sensing channel output signal acquisition module is included and configured to multiply the output complex voltages of the multi-channel capacitive sensor under actual operation by the amplitude-phase correction coefficients and obtain the multiple sensing channel output signals after eliminating inter-channel amplitude-phase inconsistency.

Further preferably, the amplitude-phase correction parameters calculating module includes the following.

A scattering parameter matrix acquisition unit is included and configured to smooth the amplitude- and phase-frequency curves of the scattering parameters at each frequency point, and the smoothed scattering parameter matrix of the $i^{th}$-channel three-admittance network is obtained.

An admittance matrix calculating unit is included and configured to calculate the admittance matrix at each frequency point of the $i^{th}$-channel three-admittance network according to its smoothed scattering parameter matrix and its termination impedances.

A three-admittance parameter calculating unit is included and configured to establish the variable optimization equations in the $i^{th}$-channel three-admittance network based on its admittance matrix and solve its three-admittance parameters at each calibration frequency point.

A correction coefficient calculating unit is included and configured to select any channel in the capacitive sensor as a reference channel, and each-channel amplitude-phase correction coefficient relative to the reference channel can be calculated according to each-channel three-admittance parameters and the output complex voltages of the multi-channel capacitive sensor at each calibration frequency point.

Further preferably, the first channel of the capacitive sensor is selected as a reference channel, and the amplitude-phase inconsistency correction coefficient of the $i^{th}$ sensing channel at each calibration frequency point relative to the reference channel is:

$$\dot{\beta}_{1i}(f) = \frac{\dot{V}_{O1}(f)}{\dot{V}_{Oi}(f)} \cdot \frac{\dot{h}_i(Y_{i1}(f), Y_{i2}(f), Y_{i3}(f))}{\dot{h}_i(Y_{11}(f), Y_{12}(f), Y_{13}(f))},$$

where $\dot{\beta}_{1i}(f)$ is the amplitude-phase inconsistency correction coefficient of the $i^{th}$ sensing channel relative to the reference channel, $\dot{V}_{O1}(f)$ is the output complex voltage of the reference channel in the capacitive sensor, $\dot{V}_{Oi}(f)$ is the output complex voltage of the multi-channel capacitive sensor, $\dot{h}_i(Y_{i1}(f), Y_{i2}(f), Y_{i3}(f))$ is the complex transfer function of the $i^{th}$-channel equivalent calibration admittance network, $\dot{h}_1(Y_{11}(f), Y_{12}(f), Y_{13}(f))$ is the complex transfer function of the reference channel in the equivalent calibration admittance network, and $Y_{i1}(f)$, $Y_{i2}(f)$, $Y_{i3}(f)$ are the three-admittance parameters of the $i^{th}$-channel equivalent calibration admittance network at each calibration frequency point.

Further preferably, the output complex voltage of multi-channel capacitive sensor at each calibration frequency point is: $\dot{V}_{Oi}(f) = I_i(f) + j \cdot Q_i(f)$, $$\begin{cases} I_i(f) = \frac{2}{N} \cdot \sum_{n=1}^{N} \left\{ i_i(n) \cos\left( \frac{2\pi \cdot \Delta f \cdot n}{f_{DDC}} \right) \right\} \\ Q_i(f) = -\frac{2}{N} \cdot \sum_{n=1}^{N} \left\{ i_i(n) \sin\left( \frac{2\pi \cdot \Delta f \cdot n}{f_{DDC}} \right) \right\} \end{cases},$$

where $i_i(n)$ is the output in-phase data sequence after digital orthogonal down-conversion which is sampled by N points with sampling rate of $f_{DDC}$, n=1, 2, . . . , N, and $\Delta f$ is a frequency difference between the local oscillator frequency $f_{LO}$ of the digital orthogonal down-conversion and the calibration input signal frequency f.

EXAMPLES

Figure 2:
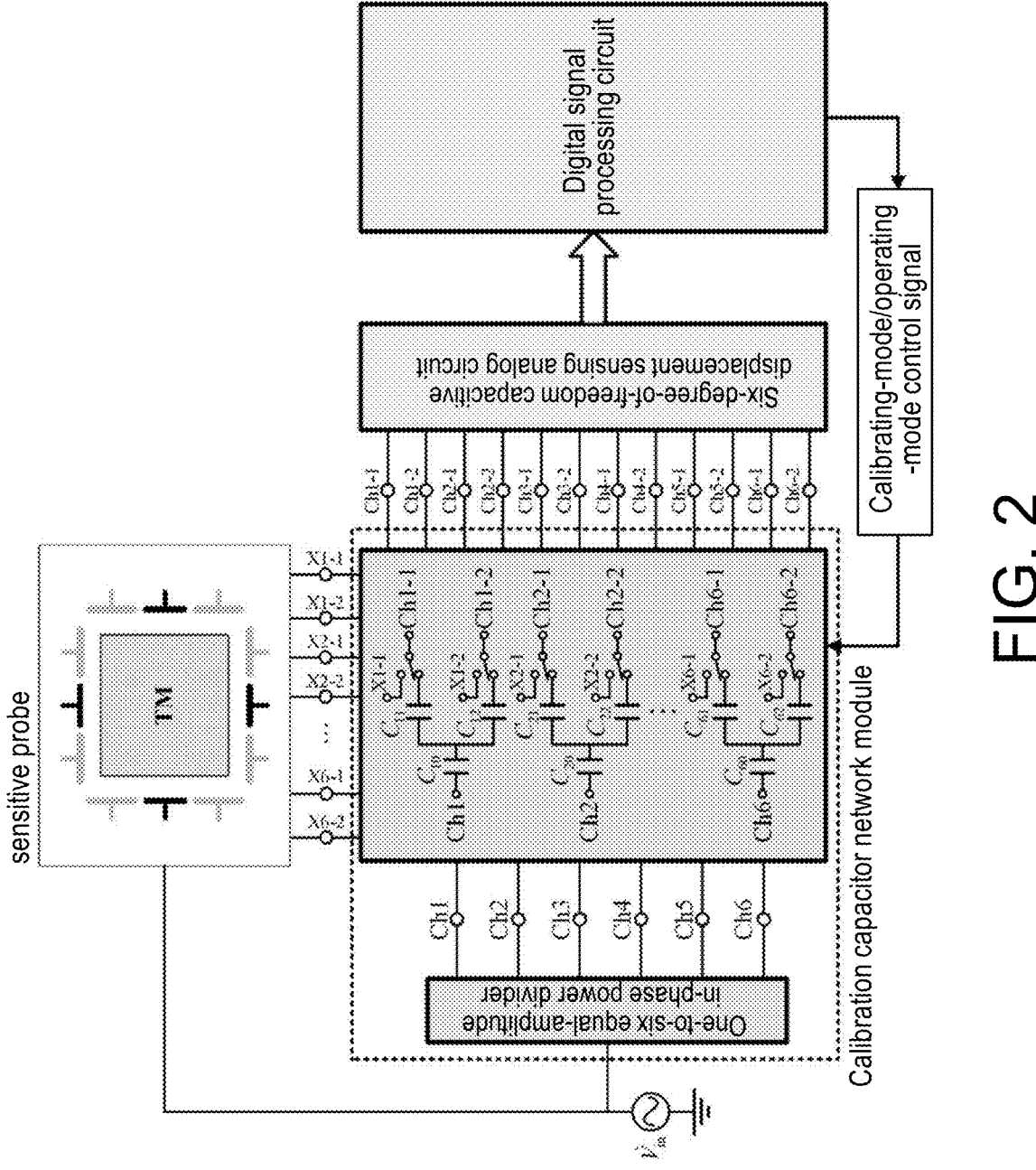
FIG. 2 is the schematic diagram of amplitude-phase inconsistency in-situ correction device of the six-channel CSCs based on the independent calibration capacitance network module according to an embodiment of the disclosure.

FIG. 1 is the flow chart of amplitude-phase inconsistency in-situ correction method for the multi-channel capacitive sensor based on a calibration capacitance network module according to the disclosure. Taking the amplitude-phase inconsistency in-situ correction of the six-channel CSCs as an example, a device of amplitude-phase inconsistency in-situ correction for the six-channel CSCs based on the independent calibration capacitance network module is shown in FIG. 2. The calibration input signal frequency f=100 kHz, and the initial phase $\varphi$=0. The six-channel circuits' output signal sampling rate after digital orthogonal down-conversion processing is $f_{DDC}$=100 Hz, and the frequency difference between the local oscillator signal of digital orthogonal down-conversion and the calibration input signal is $\Delta f$=2 Hz. Specific implementation steps are as follows.

Figure 3:
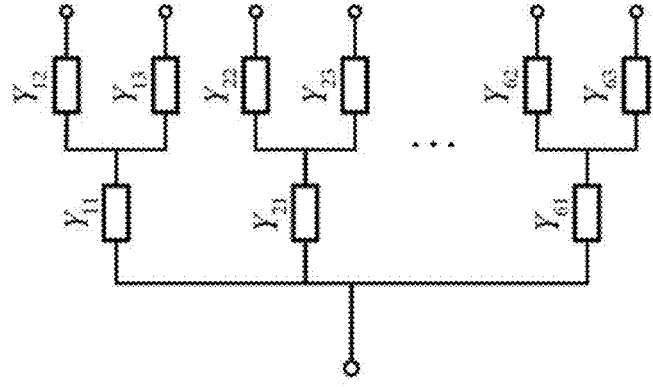
FIG. 3 is the equivalent lumped parameter circuit model and its equivalent calibration admittance network model of the calibration capacitance network module according to an embodiment of the disclosure.
Figure 3:
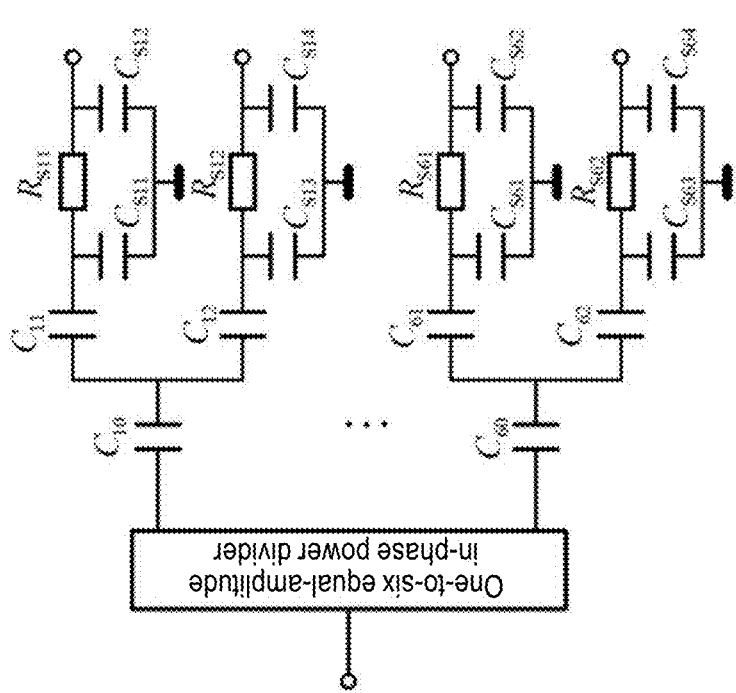

In step 1, the lumped circuit model of the calibration capacitance network module composed of a one-to-six equal-amplitude in-phase power splitter and a six-channel calibration capacitor network is equivalent to the three-admittance networks model, as shown in FIG. 3.

In step 2, a multi-port vector network analyzer is used to measure the port scattering parameters of the six-channel calibration admittance network. The admittance parameters $Y_{i1}$, $Y_{i2}$, and $Y_{i3}$ (i=1, 2, . . . , 6) of the six-way three-admittance equivalent network at the calibration frequency f=100 kHz are then calculated. The specific parameter extraction steps are as follows.

In step 2-1, the multi-port vector network analyzer is used to measure the scattering parameter matrix $S_i$ (i=1, 2, . . . , 6) of the six-channel three-admittance network at 100 kHz, and the amplitudes and phases of each scattering parameters are obtained.

In step 2-2, the L-order digital low-pass filter is used to smooth the amplitude and phase of each measured scattering parameter. The first (L/2) data of the filtered output sequence is discarded, and the smoothed scattering parameter matrix $\overline{S}_i$(i=1, 2, . . . , 6) is obtained.

In step 2-3, based on $\overline{S}_i$ of the $i^{th}$-channel three-port admittance network and its termination impedance $Z_{C_{i1}} = Z_{C_{i2}} = Z_{C_{i3}} = 50\Omega$, the admittance matrix Y of the six-channel three-port admittance network at 100 kHz is calculated:

$$Y_i = Z_i^{-1} \cdot y_i \cdot Z_i^{-1},$$

$$\text{where } Z_i = \begin{bmatrix} \sqrt{Z_{C_{i1}}} & 0 & 0 \\ 0 & \sqrt{Z_{C_{i2}}} & 0 \\ 0 & 0 & \sqrt{Z_{C_{i3}}} \end{bmatrix},$$

and the normalized admittance matrix is $y_i = (I + \overline{S}_i)^{-1}(I - \overline{S}_i)$.

In step 2-4, the three-port admittance matrix analytical expression $F(Y_{i1}, Y_{i2}, Y_{i3})$ of the $i^{th}$-channel equivalent calibration admittance network is:

$$F(Y_{i1}, Y_{i2}, Y_{i3}) =$$
$$\frac{1}{Y_{i1} + Y_{i2} + Y_{i3}} \begin{bmatrix} Y_{i1}(Y_{i2} + Y_{i3}) & -Y_{i1}Y_{i2} & -Y_{i1}Y_{i3} \\ -Y_{i1}Y_{i2} & Y_{i2}(Y_{i1} + Y_{i3}) & -Y_{i2}Y_{i3} \\ -Y_{i1}Y_{i3} & -Y_{i2}Y_{i3} & Y_{i3}(Y_{i1} + Y_{i2}) \end{bmatrix}.$$

The three-variable optimization equations for the $i^{th}$-channel three-admittance network at 100 kHz are established from $\{\det[F(Y_{i1}, Y_{i2}, Y_{i3}) - Y_i]\}^2 = 0$, and the admittance values $Y_{i1}$, $Y_{i2}$, and $Y_{i3}$ (i=1, 2, . . . , 6) are obtained through numerical solution.

In step 3, the first channel is selected as a reference channel, and the amplitude-phase correction coefficient $\dot{\beta}_{1i}$ of the six channels relative to the reference channel at the calibration frequency f=100 kHz is calculated. The detailed calculation steps are as follows:

In step 3.1, the N-point in-phase signal sequence $i_i(n)$ ($n=1, 2, \ldots, N$) of the output signal of the six-channel CSCs after digital orthogonal down-conversion processing is collected. The real part $I_i$ and imaginary part $Q_i$ of the output complex voltage $\dot{V}_{Oi}$ can be calculated:

$$
\begin{cases}
I_i = \dfrac{2}{N} \cdot \sum_{n=1}^{N} \{i_i(n) \cdot \cos(2\pi f_o n)\} \\
Q_i = -\dfrac{2}{N} \cdot \sum_{n=1}^{N} \{i_i(n) \cdot \sin(2\pi f_o n)\}
\end{cases},
$$

where the frequency $$
f_o = \frac{\Delta f}{f_{DDC}} = 0.02 \text{ Hz},
$$

thereby the output complex voltage $\dot{V}_{Oi}=I_i+j\cdot Q_i$ is obtained.

In step 3.2, according to the admittance parameters $Y_{i1}$, $Y_{i2}$, and $Y_{i3}$ of the six-channel equivalent admittance network extracted in step 3.1, the complex transfer function $\dot{h}_i(Y_{i1}, Y_{i2}, Y_{i3})$ ($i=1, 2, \ldots, 6$) of the six-channel equivalent calibration admittance network at 100 kHz is calculated:

$$
\dot{h}_i(Y_{i1}, Y_{i2}, Y_{i3}) =
$$

$$
\frac{Y_{i1} \cdot \Delta Y_i}{[(Y_{i1} + Y_{i2} + Y_{i3}) + R_P Y_{i1}(Y_{i2} + Y_{i3})] \cdot (Y_{i2} + Y_{i3}) - (1 + R_P Y_{i1}) \cdot \Delta Y_i^2},
$$

where $\Delta Y_i = Y_{i2} - Y_{i3}$, and $R_P = 50\Omega$ is the internal resistance of the calibration input carrier source.

In step 3.3, the first channel is selected as a reference channel, and when the calibration frequency $f=100$ kHz, the amplitude-phase inconsistency correction coefficients of the six-channel CSCs relative to the reference channel are calculated:

$$
\dot{\beta}_{1i} = \frac{\dot{V}_{O1}}{\dot{V}_{Oi}} \cdot \frac{h_i(Y_{i1}, Y_{i2}, Y_{i3})}{h_1(Y_{11}, Y_{12}, Y_{13})} \ (i = 1, 2, \ldots, 6).
$$

In step 4, the six-channel output complex voltage $\dot{V}_{WOi}$ is multiplied by each-channel amplitude-phase correction coefficient $\dot{\beta}_{1i}$ under operating mode. The output complex voltage $\dot{V}_{Oi}$ corrected for the amplitude-phase inconsistency of the six-channel CSCs at 100 kHz calibration frequency is obtained:

$$
\dot{V}'_{Oi} = \dot{V}_{WOi} \cdot \dot{\beta}_{1i},
$$

Where $i=1, 2, \ldots, 6$.

In conclusion, compared to the related art, advantages of the disclosure has the following advantages over the existing technology.

The disclosure provides a method and device of amplitude-phase inconsistency in-situ correction for multi-channel capacitive sensor. By extracting amplitude-phase inconsistency parameters among multiple capacitive sensing channels based on the independent calibration capacitance network module, the accurate, reliable, and high-precision correction coefficients for amplitude-phase inconsistency of multiple receiving channels are calculated. The influence of inter-channel amplitude-phase inconsistency on output signal detection is effectively compensated. Therefore, the accurate and credible multi-channel output displacement signals are obtained, so that the channel consistency of multiple DoF capacitive sensor is improved. The method and device of amplitude-phase inconsistency in-situ correction for the multi-channel capacitive sensor provided by the disclosure can be promoted and applied to the amplitude-phase inconsistency correction of various array receivers and multiple receiving channels.

The multiple DoF capacitive sensor designed based on the method and device of amplitude-phase inconsistency in-situ correction for multi-channel capacitive sensor provided by the disclosure can be applied to inertial sensors for space gravitational wave detection.

To sum up, the above technical solutions provided by the disclosure have the following beneficial effects compared with the related art.

The disclosure provides a method and device of amplitude-phase inconsistency in-situ correction for the multi-channel capacitive sensor. By extracting the amplitude-phase inconsistency parameters among multiple capacitive sensing channels based on an independent calibration capacitance network module, the accurate, reliable, and high-precision correction coefficients for amplitude-phase inconsistency of multiple receiving channels are calculated. The influence of inter-channel amplitude-phase inconsistency on output signal detection is effectively compensated. Therefore, the accurate and credible multi-channel output displacement signals are obtained, so that the channel consistency of multiple DoF displacement sensor is improved. The method and device of amplitude-phase inconsistency in-situ correction for the multi-channel capacitive sensor provided by the disclosure can be applied to amplitude-phase inconsistency correction of various array receivers and multiple receiving channels. Therefore, the disclosure exhibits significant engineering application value in actual sensing circuit design and array signal processing systems.

It should be understood that the abovementioned device is used to perform the method in the abovementioned embodiments. The implementation principles and technical effects of the corresponding program modules in the device are similar to those described in the above method. The working process of the device can be referred to the corresponding process in the above method, and description is not provided again herein.

It can be understood that the various numerical symbols involved in the embodiments of the disclosure are only for the convenience of description and are not used to limit the scope of the embodiments of the disclosure.

A person having ordinary skill in the art should be able to easily understand that the above description is only preferred embodiments of the disclosure and is not intended to limit the disclosure. Any modifications, equivalent replacements, and improvements made without departing from the spirit and principles of the disclosure should fall within the protection scope of the disclosure.

What is claimed is:

1. A method of amplitude-phase inconsistency in-situ correction for a multi-channel capacitive sensor, comprising:

S1: under a calibrating mode, inputting a calibration signal from a calibration capacitance network module to the multi-channel capacitive sensor, and measuring output complex voltages of the multi-channel capacitive sensor at each calibration frequency point;

S2: equating the calibration capacitance network module to multi-channel three-admittance networks, measuring port scattering parameters of each equivalent three-admittance network, and extracting three-admittance parameters of each-channel at each calibration frequency point;

S3: selecting any channel of the multi-channel capacitive sensor as a reference channel; calculating an amplitude-phase correction coefficient of each-channel relative to the reference channel through combining the three-admittance parameters of each-channel at each calibration frequency point and the output complex voltages of the multi-channel capacitive sensor at each calibration frequency point;

S4: under an operating mode, inputting a carrier signal to the multi-channel capacitive sensor through a multiple degree of freedom (DoF) sensitive probe, and measuring the output complex voltages of the multi-channel capacitive sensor under actual operation;

S5: multiplying the output complex voltages of the multi-channel capacitive sensor under actual operation by the amplitude-phase correction coefficients, thereby obtaining multiple sensing channel output signals after eliminating inter-channel amplitude-phase inconsistency, wherein the calibration capacitance network module comprises a one-to-multiple equal-amplitude in-phase power splitter and a multi-channel calibration capacitance network, and each channel of which comprises three capacitors with the same nominal value and connected in a Y-shaped manner, and two single-pole double-throw switches connected to the capacitors.

2. The method of the amplitude-phase inconsistency in-situ correction for the multi-channel capacitive sensor according to claim 1, wherein the method of extracting the three-admittance parameters of each channel at each calibration frequency point comprises:

equating the calibration capacitance network module to the three-admittance networks, measuring a scattering parameter matrix of an $i^{th}$-channel three-admittance network at each frequency point, thereby calculating the amplitudes and phases of the scattering parameters at each frequency point;

smoothing curves of amplitude and phase to frequency of the scattering parameters at each frequency point, thus obtaining a smoothed scattering parameter matrix of the $i^{th}$ channel three-admittance network;

calculating the admittance matrix at each frequency point of the $i^{th}$-channel three-admittance network according to its smoothed scattering parameter matrix and its termination impedances;

establishing variable optimization equations in the $i^{th}$-channel three-admittance network based on its admittance matrix and solving its three-admittance parameters at each calibration frequency point.

3. The method of amplitude-phase inconsistency in-situ correction for the multi-channel capacitive sensor according to claim 2, wherein a first channel of the multi-channel capacitive sensor is selected as the reference channel, and the amplitude-phase inconsistency correction coefficient of an $i^{th}$ sensing channel at each calibration frequency point relative to the reference channel is:

$$\dot{\beta}_{1i}(f) = \frac{\dot{V}_{O1}(f)}{\dot{V}_{Oi}(f)} \cdot \frac{\dot{h}_i(Y_{i1}(f), Y_{i2}(f), Y_{i3}(f))}{\dot{h}_i(Y_{11}(f), Y_{12}(f), Y_{13}(f))},$$

wherein $\dot{\beta}_{1i}(f)$ is the amplitude-phase inconsistency correction coefficient of the $i^{th}$ sensing channel relative to the reference channel, $\dot{V}_{O1}(f)$ is the output complex voltage of the reference channel in the multi-channel capacitive sensor, $\dot{V}_{Oi}(f)$ is the output complex voltage of the multi-channel capacitive sensor, $\dot{h}_i(Y_{i1}(f), Y_{i2}(f), Y_{i3}(f))$ is a complex transfer function of an $i^{th}$-channel equivalent calibration admittance network, $\dot{h}_1(Y_{11}(f), Y_{12}(f), Y_{13}(f))$ is a complex transfer function of the reference channel in the equivalent calibration admittance network, and $Y_{i1}(f)$, $Y_{i2}(f)$, $Y_{i3}(f)$ are the three-admittance parameters of the $i^{th}$-channel equivalent calibration admittance network at each calibration frequency point.

4. The method of amplitude-phase inconsistency in-situ correction for the multi-channel capacitive sensor according to claim 1, wherein a first channel of the multi-channel capacitive sensor is selected as the reference channel, and the amplitude-phase inconsistency correction coefficient of an $i^{th}$ sensing channel at each calibration frequency point relative to the reference channel is:

$$\dot{\beta}_{1i}(f) = \frac{\dot{V}_{O1}(f)}{\dot{V}_{Oi}(f)} \cdot \frac{\dot{h}_i(Y_{i1}(f), Y_{i2}(f), Y_{i3}(f))}{\dot{h}_i(Y_{11}(f), Y_{12}(f), Y_{13}(f))},$$

wherein $\dot{\beta}_{1i}(f)$ is the amplitude-phase inconsistency correction coefficient of the $i^{th}$ sensing channel relative to the reference channel, $\dot{V}_{O1}(f)$ is the output complex voltage of the reference channel in the multi-channel capacitive sensor, $\dot{V}_{Oi}(f)$ is the output complex voltage of the multi-channel capacitive sensor, $\dot{h}_i(Y_{i1}(f), Y_{i2}(f), Y_{i3}(f))$ is a complex transfer function of an $i^{th}$-channel equivalent calibration admittance network, $\dot{h}_1(Y_{11}(f), Y_{12}(f), Y_{13}(f))$ is a complex transfer function of the reference channel in the equivalent calibration admittance network, and $Y_{i1}(f)$, $Y_{i2}(f)$, $Y_{i3}(f)$ are the three-admittance parameters of the $i^{th}$-channel equivalent calibration admittance network at each calibration frequency point.

5. The method of amplitude-phase inconsistency in-situ correction for the multi-channel capacitive sensor according to claim 1, wherein the output complex voltage of the multi-channel capacitive sensor at each calibration frequency point is: $\dot{V}_{Oi}(f) = I_i(f) + j \cdot Q_i(f)$, $$\begin{cases} I_i(f) = \frac{2}{N} \cdot \sum_{n=1}^{N} \left\{ i_i(n) \cos\left(\frac{2\pi \cdot \Delta f \cdot n}{f_{DDC}}\right) \right\} \\ Q_i(f) = -\frac{2}{N} \cdot \sum_{n=1}^{N} \left\{ i_i(n) \sin\left(\frac{2\pi \cdot \Delta f \cdot n}{f_{DDC}}\right) \right\} \end{cases},$$

wherein $i_i(n)$ is an output in-phase data sequence after performing a digital orthogonal down-conversion which is sampled by N points with a sampling rate of $f_{DDC}$, $n = 1, 2, \ldots, N$, and $\Delta f$ is a frequency difference between a local oscillator frequency $f_{LO}$ of the digital orthogonal down-conversion and a calibration input signal frequency f.

* * * * *